(12) United States Patent
Phillips et al.

(10) Patent No.: US 11,673,059 B2
(45) Date of Patent: Jun. 13, 2023

(54) AUTOMATIC PRESENTATION OF SUITABLE CONTENT

(71) Applicant: Roblox Corporation, San Mateo, CA (US)

(72) Inventors: Peter John Phillips, San Mateo, CA (US); Matthew Dean, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

(21) Appl. No.: 17/475,844

(22) Filed: Sep. 15, 2021

(65) Prior Publication Data

US 2022/0370919 A1 Nov. 24, 2022

Related U.S. Application Data

(60) Provisional application No. 63/189,964, filed on May 18, 2021.

(51) Int. Cl.
*A63F 13/77* (2014.01)
*A63F 13/537* (2014.01)
*A63F 13/60* (2014.01)
*A63F 13/73* (2014.01)
*A63F 13/79* (2014.01)
*G06F 16/48* (2019.01)

(52) U.S. Cl.
CPC .......... *A63F 13/77* (2014.09); *A63F 13/537* (2014.09); *A63F 13/60* (2014.09); *A63F 13/73* (2014.09); *A63F 13/79* (2014.09); *G06F 16/48* (2019.01); *A63F 2300/5546* (2013.01); *A63F 2300/6009* (2013.01)

(58) Field of Classification Search
CPC .............................. A63F 13/537; A63F 13/77
See application file for complete search history.

(56) References Cited

U.S. PATENT DOCUMENTS 11,461,434 B2 * 10/2022 Sitrick .................. G06F 21/602
2002/0169592 A1 * 11/2002 Aityan .................... G06F 40/58
704/2
2004/0194128 A1 9/2004 McIntyre et al.
(Continued)

OTHER PUBLICATIONS

USPTO, International Search Report for International Patent Application No. PCT/US2022/029808, dated Sep. 2, 2022, 2 pages.
(Continued)

*Primary Examiner* — Steve Rowland
(74) *Attorney, Agent, or Firm* — IP Spring

(57) ABSTRACT

Implementations described herein relate to methods, systems, and computer-readable media to automatically present suitable content for a particular locale. In some implementations, a computer-implemented method includes receiving gaming content associated with a game associated with a first client locale, the received gaming content including content that is restricted at a second client locale, receiving at least one content alternative, the at least one content alternative being an alternative to replace the received gaming content, generating a first localized rating for the received gaming content and a second localized rating for the at least one content alternative, and automatically providing the received gaming content or the at least one content alternative to a user device associated with the second client locale based on the first localized rating and the second localized rating.

18 Claims, 8 Drawing Sheets

(56) References Cited

U.S. PATENT DOCUMENTS

| | | | |
|---|---|---|---|
| 2006/0161952 A1 | 7/2006 | Herz et al. | |
| 2006/0206871 A1* | 9/2006 | Kohlmeier | G06F 9/454 |
| | | | 717/132 |
| 2007/0099706 A1* | 5/2007 | Nuta | A63F 13/95 |
| | | | 463/44 |
| 2009/0198789 A1* | 8/2009 | Young | A63F 13/77 |
| | | | 709/213 |
| 2010/0241417 A1* | 9/2010 | Bassett | G06F 40/58 |
| | | | 704/8 |
| 2012/0096514 A1 | 4/2012 | Tuscano et al. | |
| 2012/0221321 A1* | 8/2012 | Nakamura | G10L 15/32 |
| | | | 704/E13.001 |
| 2014/0068661 A1* | 3/2014 | Gates, III | H04N 21/44218 |
| | | | 725/34 |
| 2014/0337989 A1* | 11/2014 | Orsini | H04L 51/212 |
| | | | 726/26 |
| 2015/0120273 A1* | 4/2015 | Gusakov | G06F 40/58 |
| | | | 704/2 |
| 2015/0242917 A1* | 8/2015 | Curtis | G06Q 30/0255 |
| | | | 705/26.41 |
| 2015/0302891 A1 | 10/2015 | Barton et al. | |
| 2016/0107088 A1* | 4/2016 | Jackson | A63F 13/792 |
| | | | 463/29 |
| 2016/0287984 A1* | 10/2016 | Principato | A63F 13/352 |
| 2017/0083512 A1* | 3/2017 | Bangarambandi | G06F 9/454 |
| 2017/0169015 A1* | 6/2017 | Huang | G06F 40/51 |
| 2019/0356753 A1* | 11/2019 | Yong | A63F 13/69 |
| 2019/0361797 A1 | 11/2019 | Yerli | |
| 2020/0077150 A1 | 3/2020 | Fox et al. | |
| 2020/0394059 A1* | 12/2020 | Wei | G06F 40/58 |
| 2022/0067307 A1* | 3/2022 | Rei | G06N 3/0454 |

OTHER PUBLICATIONS

USPTO, Written Opinion for International Patent Application No. PCT/US2022/029808, dated Sep. 2, 2022, 6 pages.

* cited by examiner

… (1)

AUTOMATIC PRESENTATION OF SUITABLE CONTENT

CROSS REFERENCE TO RELATED APPLICATIONS

The present application claims the benefit of priority to U.S. Provisional Application Ser. No. 63/189,964, filed on May 18, 2021, entitled "Automatic Presentation of Suitable Content," the entire contents of which are hereby incorporated by reference herein.

TECHNICAL FIELD

Embodiments relate generally to computer-based gaming, and more particularly, to methods, systems, and computer readable media for automatic presentation of suitable content.

BACKGROUND

Some online platforms (e.g. gaming platforms, media exchange platforms, etc.), allow users to connect with each other, interact with each other (e.g., within a game), create games, and share information with each other via the Internet. The online platforms may further provide gaming content. It follows that as gaming content is produced for a first region or locale, users in other regions or locales may desire similar or the same gaming content.

In order to provide gaming content to the other regions, game developers need to devote resources to ensure the gaming content is suitable for the target region or locale. As some regions have differing rules and standards for presentation of gaming content, and some users have different content preferences, ensuring that the content of a game is suitable for a particular region can be difficult or unmanageable. Moreover, some regions may allow some portions of content (e.g., adult language) while completely restricting others (e.g., loot boxes, depictions of violence), further complicating providing localized content to multiple regions or locales.

Some implementations were conceived in light of the above.

SUMMARY

According to an aspect, a computer-implemented method of presentation of suitable content is provided. The method includes: receiving gaming content associated with a game associated with a first client locale, the received gaming content including content that is restricted at a second client locale; receiving at least one content alternative, the at least one content alternative being an alternative to replace the received gaming content; generating a first localized rating for the received gaming content and a second localized rating for the at least one content alternative; and automatically providing the received gaming content or the at least one content alternative to a user device associated with the second client locale based on the first localized rating and the second localized rating.

In some implementations, the gaming content is received from a content developer associated with the first client locale.

In some implementations, an application programming interface (API) is exposed to the developer, the API usable by the developer in computer code to automatically generate the at least one content alternative.

In some implementations, an API is exposed to the developer, the API usable by the developer in computer code to automatically generate the first localized rating and the second localized rating.

In some implementations, generating the first localized rating and the second localized rating comprises receiving from the developer a self-rating of the received gaming content and a self-rating of the at least one content alternative.

In some implementations, receiving the self-rating of the received gaming content and the self-rating of the at least one content alternative comprises receiving, from the developer, a flag for content that is unsuitable for a particular demographic of users.

In some implementations, the first localized rating is a video game rating associated with a set of local rules associated with the first client locale, and wherein the second localized rating is a video game rating associated with a set of local rules associated with the second client locale.

In some implementations, the at least one content alternative is indexed and stored in a library of alternatives and is identifiable as a replacement for the received gaming content.

In some implementations, the automatically providing comprises: determining that the first localized rating is suitable for the second client locale; and responsive to determining that the first localized rating is suitable for the second client locale, presenting the received gaming content to the user device associated with the second client locale.

In some implementations, the automatically providing comprises: determining that the first localized rating is unsuitable for the second client locale; determining that the second localized rating is suitable for the second client locale; and responsive to determining that the second localized rating is suitable for the second client locale, presenting the at least one content alternative to the user device associated with the second client locale.

According to yet another aspect, a system includes: a memory with instructions stored thereon; and a processing device, coupled to the memory, the processing device configured to access the memory and execute the instructions. In some implementations, the instructions cause the processing device to perform operations including: receiving gaming content associated with a game associated with a first client locale, the received gaming content including content that is restricted at a second client locale; receiving at least one content alternative, the at least one content alternative being an alternative to replace the received gaming content; generating a first localized rating for the received gaming content and a second localized rating for the at least one content alternative; and automatically providing the received gaming content or the at least one content alternative to a user device associated with the second client locale based on the first localized rating and the second localized rating.

In some implementations, the gaming content is received from a content developer associated with the first client locale, and wherein an application programming interface (API) is exposed to the developer, the API usable by the developer in computer code to automatically generate the at least one content alternative.

In some implementations, an API is exposed to the developer, the API usable by the developer in computer code to automatically generate the first localized rating and the second localized rating.

In some implementations, generating the first localized rating and the second localized rating comprises receiving from the developer a self-rating of the received gaming content and a self-rating of the at least one content alternative.

In some implementations, receiving the self-rating of the received gaming content and the self-rating of the at least one content alternative comprises receiving, from the developer, a flag for content that is unsuitable for a particular demographic of users.

In some implementations, the first localized rating is a video game rating associated with a set of local rules associated with the first client locale, and wherein the second localized rating is a video game rating associated with a set of local rules associated with the second client locale.

In some implementations, the system further comprises a library of alternatives, and wherein the at least one content alternative is indexed and stored in the library of alternatives and is identifiable as a replacement for the received gaming content.

In some implementations, the automatically providing comprises: determining that the first localized rating is suitable for the second client locale; and responsive to determining that the first localized rating is suitable for the second client locale, presenting the received gaming content to the user device associated with the second client locale.

In some implementations, the automatically providing comprises: determining that the first localized rating is unsuitable for the second client locale; determining that the second localized rating is suitable for the second client locale; and responsive to determining that the second localized rating is suitable for the second client locale, presenting the at least one content alternative to the user device associated with the second client locale According to still another aspect, a non-transitory computer-readable medium with instructions stored thereon that, responsive to execution by a processing device, causes the processing device to perform operations including: receiving gaming content associated with a game associated with a first client locale, the received gaming content including content that is restricted at a second client locale; receiving at least one content alternative, the at least one content alternative being an alternative to replace the received gaming content; generating a first localized rating for the received gaming content and a second localized rating for the at least one content alternative; and automatically providing the received gaming content or the at least one content alternative to a user device associated with the second client locale based on the first localized rating and the second localized rating

DETAILED DESCRIPTION

Figure 1:
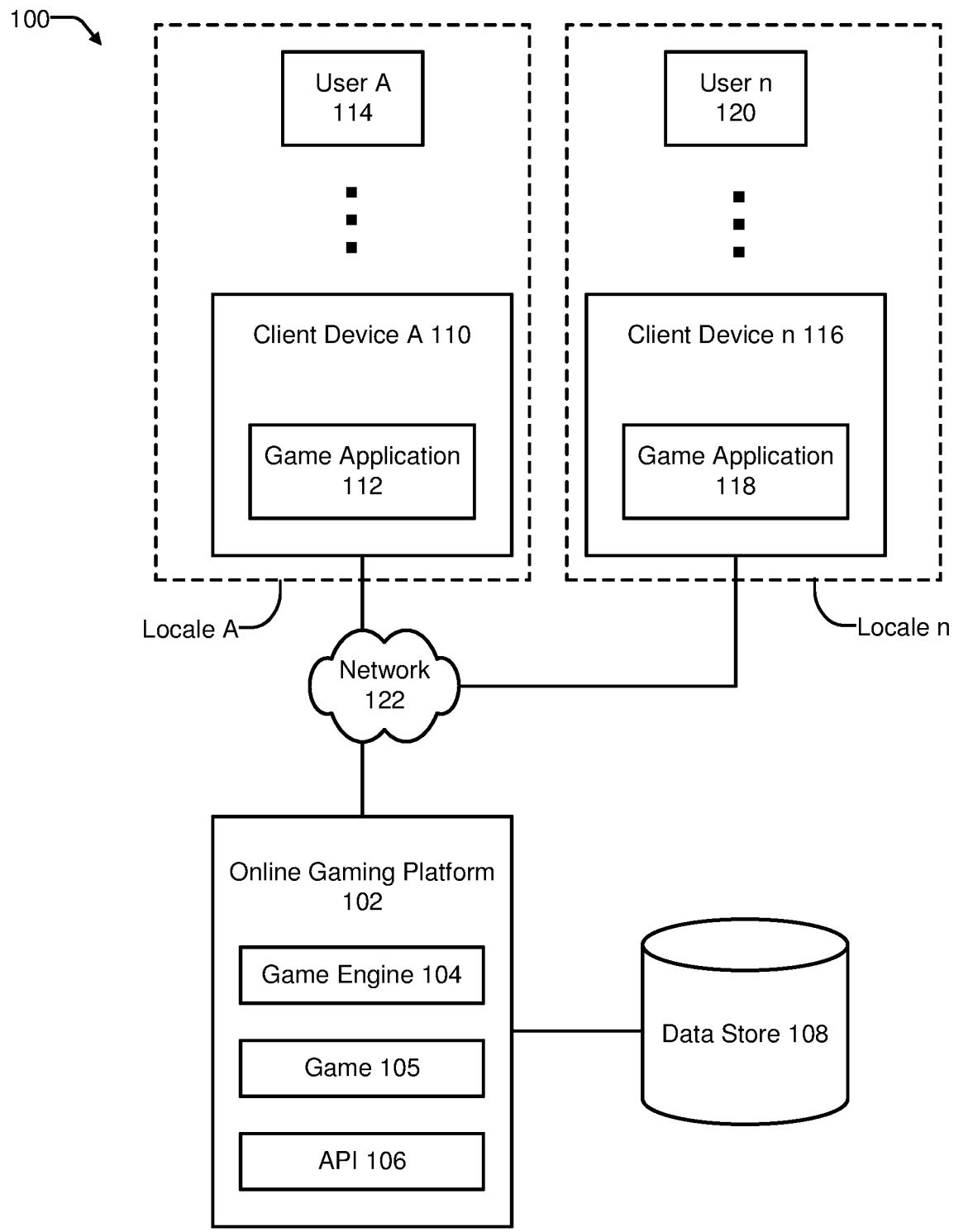
FIG. 1 is a diagram of an example network environment for automatic presentation of suitable content, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

Online gaming platforms (also referred to as "user-generated content platforms" or "user-generated content systems") offer a variety of ways for users to interact with one another. For example, users of an online gaming platform may work together towards a common goal, share various virtual gaming items, send electronic messages to one another, and so forth. Users of an online gaming platform may join games as virtual characters, playing game-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by one or more non-player characters (NPC) which may be computer-generated characters, e.g., when a single player is part of a game.

An online gaming platform may also allow users (developers) of the platform to create new games, characters, and/or other content. For example, users of the online gaming platform may be enabled to create, design, and/or customize new characters or avatars, items, or other content, and make them available to other users.

New user content may be generated and associated with a particular online game. The new user content may be targeted for a specific region or locale—where the "association" is independent of where the content is generated. Region/locale may be used to determine features such as language (for text content), visual appearance (for images), animation type, or any other content attributes. Region or locale may refer to a geographic region, e.g., a city, state, country, continent, etc. or geographic regions defined in other ways (e.g., by local government, regulations, etc.). If the game is to be accessed or played in a separate region, the new content is typically subject to the locale's specific governance as related to restrictions on access to content.

For example, a locale may restrict user content related to gambling, questionable paraphernalia, monetization, language, and others.

Additionally, the described techniques can also customize content for a particular demographic. For example, new user content may be generated and associated with a particular online game. The new user content may be targeted for a specific demographic—where the "association" is independent of where the content is generated. The targeted demographic may include an age group, such as, general audience, young children, young adults, adults, or other age groups. The targeted demographic may also include a demographic group, such as, male or female players or other demographics. As such, while examples described herein may include a targeted region or locale as one specific example, the described techniques also include a targeted group of players irrespective of a locale, in some implementations.

Gaming content may similarly be generated for a first region or locale. Thus, if the game is to be accessed or played in a different region, the gaming content is also typically subject to restrictions to content for the new region.

An objective of the game platform owner or administrator may include rating of the new user content, the gaming content, and any other content associated with a game such that only suitable content is presented at the locale. A technical problem for game platform operators is to ensure suitability of game content associated with the game platform, which can include complex regional, age group, demographic, or locale-specific restrictions on particular game content.

Online game platforms can be massive and reach a plurality of locales that include restrictions on content that change over time. A game platform that accurately rates or otherwise ensures suitable content can therefore effectively present games without becoming afoul of local regulations.

For example, in conventional content presentation, a game platform operator needs to engage in lengthy processes whereby locale-specific users and/or regulatory bodies examine gaming content to rate particular content. This can include delays including vetting, quality control, and other measures to ensure only appropriate content is distributed via media to particular locales. However, online game platforms constantly produce new content, rendering traditional approaches difficult or impossible to employ.

The present disclosure addresses the above-described drawbacks by providing a novel network environment and methods that process and rate gaming content for new locales. Developers may be presented with a user interface and Application Programming Interface (API) that allows self-rating of different aspects of a game (e.g., game character or avatars, game items, etc.), and further provides storage of alternative game content more suitable to restrictive locales. Gaming content may be rated, parsed/indexed, and stored for deployment to a desired locale such that users accessing a game from multiple locales may be presented content that is suitable for their demographic and their respective locale.

The network environment may also allow game developers to obtain locale-specific guidelines, utilize the API (e.g., provided by the game platform) to generate and provide a library of alternate content, and otherwise ensure suitable content for their game to be presented at a particular locale. Through automatic rating and storage of alternate game content, larger audiences can be reached while ensuring a high quality online game experience generally commensurate with other locales.

FIG. 1 illustrates an example network environment 100, in accordance with some implementations of the disclosure. FIG. 1 and the other figures use like reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral.

The network environment 100 (also referred to as a "system" herein) includes an online gaming platform 102, a first client device 110, a second client device 116 (generally referred to as "client devices 110/116" herein), and a network 122. The client device 110 may be associated with a first Locale A while the second client device 116 may be associated with a second Locale n. The network 112 may communicate through any plurality of locales, providing for communication between the client devices 110/116 and the online gaming platform 102.

The online gaming platform 102 can include, among other things, a game engine 104, one or more games 105, an API 106, and a data store 108. The client device 110 can include a game application 112. The client device 116 can include a game application 118. Users 114 and 120 can use client devices 110 and 116, respectively, to interact with the online gaming platform 102.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online gaming platform 102 can include a server having one or more computing devices (e.g., a cloud computing system, a rackmount server, a server computer, cluster of physical servers, virtual server, etc.). In some implementations, a server may be included in the online gaming platform 102, be an independent system, or be part of another system or platform.

In some implementations, the online gaming platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming platform 102 and to provide a user with access to online gaming platform 102. The online gaming platform 102 may also include a website (e.g., one or more webpages) or application back-end software that may be used to provide a user with access to content provided by online gaming platform 102. For example, users may access online gaming platform 102 using the game application 112/118 on client devices 110/116, respectively.

In some implementations, online gaming platform 102 may include a type of social network providing connections between users or a type of user-generated content system that allows users (e.g., end-users or consumers) to communicate with other users via the online gaming platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming platform 102 may be a virtual gaming platform. For example, the gaming platform may provide single-player or multiplayer games to a community of users that may access or interact with games (e.g., user generated games or other games) using client devices 110/116 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may search for games and game items, and participate in gameplay with other users in one or more games. In some implementations, a game may be played in real-time with other users of the game.

In some implementations, other collaboration platforms can be used with rating and presentation features described herein instead of or in addition to online gaming platform 102. For example, a social networking platform, purchasing platform, messaging platform, creation platform, etc. can be used.

In some implementations, gameplay may refer to interaction of one or more players using client devices (e.g., 110 and/or 116) within a game (e.g., 105) or the presentation of the interaction on a display or other output device of a client device 110 or 116.

One or more games 105 are provided by the online gaming platform. In some implementations, a game 105 can include an electronic file that can be executed or loaded using software, firmware or hardware configured to present the game content (e.g., digital media item) to an entity. In some implementations, a game application 112/118 may be executed and a game 105 rendered in connection with a game engine 104. In some implementations, a game 105 may have a common set of rules or common goal, and the environments of a game 105 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game 105 may be collectively referred to a "world" or "gaming world" or "virtual world" or "universe" herein. An example of a world may be a 3D world of a game 105. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, games may have alternate content (described in more detail with reference to FIG. 2) stored in a library of alternatives. The alternate content may be produced by a developer through use of the API 106 or instructions thereof, and may include alternate content for presentation at different locales. Accordingly, the online gaming platform 102 may present alternate content at Locale n compared to Locale A. The alternate content may include a plurality of content, with each content rated differently based on demographic, age, or other factors.

In some implementations, the online gaming platform 102 can host one or more games 105 and can permit users to interact with the games 105 (e.g., search for games, game-related content, or other content) using a game application 112/118 of client devices 110/116. Users (e.g., 114 and/or 120) of the online gaming platform 102 may play, create, interact with, or build games 105, search for games 105, communicate with other users, create and build objects (e.g., also referred to as "item(s)" or "game objects" or "virtual game item(s)" herein) of games 105, and/or search for objects. For example, in generating user-generated virtual items, users may create characters, decoration for the characters, one or more virtual environments for an interactive game, or build structures used in a game 105, among others.

In some implementations, users (e.g., 114 and/or 120) of the online gaming platform 102 may create, build, and rate games 105 through use of the API 106. During creation and building, or subsequent thereto, the users of the online gaming platform 102 may rate the entirety or portions of the created games. The rating may be facilitated through a self-rating questionnaire and/or survey, such that a presentation of content suitable for a particular locale is possible by only presenting content rated as suitable from the developing user. Furthermore, through rating particular portions, and creation of corresponding alternate portions with different ratings, a game with alternate content suitable for a particular locale may be facilitated.

In some implementations, users may buy, sell, or trade game virtual game objects, such as in-platform currency (e.g., virtual currency), with other users of the online gaming platform 102. In some implementations, online gaming platform 102 may transmit game content to game applications (e.g., 112). In some implementations, game content (also referred to as "content" herein) may refer to any data or software instructions (e.g., game objects, game, user information, video, images, commands, media item, etc.) associated with online gaming platform 102 or game applications.

In some implementations, game objects (e.g., also referred to as "item(s)" or "objects" or "virtual game item(s)" herein) may refer to objects that are used, created, shared or otherwise depicted in game applications 105 of the online gaming platform 102 or game applications 112 or 118 of the client devices 110/116. For example, game objects may include a part, model, character, tools, weapons, clothing, buildings, vehicles, currency, flora, fauna, components of the aforementioned (e.g., windows of a building), and so forth.

In some implementations, game objects and virtual game objects may also have suitable alternates created by users of the online gaming platform 102. In this manner, if a particular locale has restrictions on virtual currency or other virtual game objects, a user may designate appropriate alternate virtual game objects for deployment at those locales. Similarly, if a particular locale has restrictions on tools or weapons, a user may designate alternate game objects for deployment at those locales. Furthermore, alternate content appropriate for multiple age groups, or targeted for more mature groups, can also be created through the API 106.

It may be noted that the online gaming platform 102 hosting games 105, is provided for purposes of illustration, rather than limitation. In some implementations, online gaming platform 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 105 may be associated with a particular user or a particular group of users (e.g., a private game), or made widely available to users of the online gaming platform 102 (e.g., a public game). In some implementations, where online gaming platform 102 associates one or more games 105 with a specific user or group of users, online gaming platform 102 may associate the specific user(s) with a game 105 using user account information (e.g., a user account identifier such as username and password). In these circumstances, the API 106 may also facilitate privatizing a particular game or game content such that it may be rated by the private group to aid in determining suitable content for a particular locale. Upon rating, and possibly upon generation of suitable alternate content, some games may then become a public game with alternate content presented depending upon a particular locale, demographic, age group, and/or other considerations.

In some implementations, online gaming platform 102 or client devices 110/116 may include a game engine 104 or game application 112/118. The game engine 104 can include a game application similar to game application 112/118. In some implementations, game engine 104 may be used for the development or execution of games 105. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, physics commands, etc.). In some implementations, game applications 112/118 of client devices 110/116, respectively, may work independently, in collaboration with game engine 104 of online gaming platform 102, or a combination of both.

In some implementations, both the online gaming platform 102 and client devices 110/116 execute a game engine (104, 112, and 118, respectively). The online gaming platform 102 using game engine 104 may perform some or all the game engine functions (e.g., generate physics commands, rendering commands, etc.), or offload some or all the game engine functions to game engine 104 of client device 110. In some implementations, each game 105 may have a different ratio between the game engine functions that are performed on the online gaming platform 102 and the game engine functions that are performed on the client devices 110 and 116.

For example, the game engine 104 of the online gaming platform 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming platform 102 and client device 110 may be changed (e.g., dynamically) based on gameplay conditions. For example, if the number of users participating in gameplay of a game 105 exceeds a threshold number, the online gaming platform 102 may perform one or more game engine functions that were previously performed by the client devices 110 or 116.

For example, users may be playing a game 105 on client devices 110 and 116, and may send control instructions (e.g., user inputs, such as right, left, up, down, user election, or character position and velocity information, etc.) to the online gaming platform 102. Subsequent to receiving control instructions from the client devices 110 and 116, the online gaming platform 102 may send gameplay instructions (e.g., position and velocity information of the characters participating in the group gameplay or commands, such as rendering commands, collision commands, etc.) to the client devices 110 and 116 based on control instructions. For instance, the online gaming platform 102 may perform one or more logical operations (e.g., using game engine 104) on the control instructions to generate gameplay instruction for the client devices 110 and 116. In other instances, online gaming platform 102 may pass one or more of the control instructions from one client device 110 to other client devices (e.g., 116) participating in the game 105. The client devices 110 and 116 may use the gameplay instructions and render the gameplay for presentation on the displays of client devices 110 and 116.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming platform 102. In other implementations, the control instructions may be sent from a client device 110 to another client device (e.g., 116), where the other client device generates gameplay instructions using the local game engine 104. The control instructions may include instructions to play a voice communication message or other sounds from another user on an audio device (e.g., speakers, headphones, etc.).

In some implementations, gameplay instructions may refer to instructions that allow a client device 110 (or 116)

to render gameplay of a game, such as a multiplayer game. The gameplay instructions may include one or more of user input (e.g., control instructions), character position and velocity information, or commands (e.g., physics commands, rendering commands, collision commands, etc.).

In some implementations, characters (or game objects generally) are constructed from components, one or more of which may be selected by the user, that automatically join together to aid the user in editing. One or more characters (also referred to as an "avatar" or "model" herein) may be associated with a user where the user may control the character to facilitate a user's interaction with the game 105. In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online gaming platform 102. In some implementations, creating, modifying, or customizing characters, other game objects, games 105, or game environments may be performed by a user using a user interface (e.g., developer interface) and with or without scripting (or with or without an application programming interface (API 106)). It may be noted that for purposes of illustration, rather than limitation, characters are described as having a humanoid form. In may further be noted that characters may have any form such as a vehicle, animal, inanimate object, or other creative form.

In some implementations, the online gaming platform 102 may store characters created by users in the data store 108. In some implementations, the online gaming platform 102 maintains a character catalog and game catalog that may be presented to users via the game engine 104, game 105, and/or client device 110/116. In some implementations, the game catalog includes images of games stored on the online gaming platform 102. In addition, a user may select a character (e.g., a character created by the user or other user) from the character catalog to participate in the chosen game. The character catalog includes images of characters stored on the online gaming platform 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming platform 102.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online gaming platform 102 at any given moment. It may be noted that the number of client devices 110 or 116 is provided as illustration, rather than limitation. In some implementations, any number of client devices 110 or 116 may be used.

In some implementations, each client device 110 or 116 may include an instance of the game application 112 or 118, respectively. In one implementation, the game application 112 or 118 may permit users to use and interact with online gaming platform 102, such as search for a game or other content, control a virtual character in a virtual game hosted by online gaming platform 102, or view or upload content, such as games 105, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 or 116 and allows users to interact with online gaming platform 102. The game application may render, display, or present the content (e.g., a web page, a user interface, a media viewer) to a user. In an implementation, the game application may also include an embedded media player (e.g., a Flash® player) that is embedded in a web page.

According to aspects of the disclosure, the game application 112/118 may be an online gaming platform application for users to build, create, edit, upload content to the online gaming platform 102 as well as interact with online gaming platform 102 (e.g., play games 105 hosted by online gaming platform 102). As such, the game application 112/118 may be provided to the client device 110 or 116 by the online gaming platform 102. In another example, the game application 112/118 may be an application that is downloaded from a server.

In some implementations, a user may login to online gaming platform 102 via the game application. The user may access a user account by providing user account information (e.g., username and password) where the user account is associated with one or more characters available to participate in one or more games 105 of online gaming platform 102.

In general, functions described as being performed by the online gaming platform 102 can also be performed by the client device(s) 110 or 116, or a server, in other implementations if appropriate. In addition, the functionality attributed to a particular component can be performed by different or multiple components operating together. The online gaming platform 102 can also be accessed as a service provided to other systems or devices through appropriate application programming interfaces (APIs), and thus is not limited to use in websites.

In some implementations, online gaming platform 102 may include an API 106. In some implementations, the API 106 may be a system, application, software code, or module that enables the online gaming platform 102 to expose rating and alternate content functionality to users, where the rating and alternate content functionality permits the users to rate games, and create alternate game-related content, items, listing of items, or other content within the online gaming platform 102. In some implementations, the API 106 may facilitate, in concert with the game engine 104 and online gaming platform 102, one or more of the operations described below in connection with the flowcharts shown in FIGS. 6, and 7, utilizing the features illustrated in FIGS. 1 and 2. It is further noted, that the API 106 may provide an interface of instructions exposed to a developer including self-rating questionnaires, surveys, goals, proposed actions, and/or appropriate methods for indexing alternate content, for example.

Generally, the API 106 may be exposed to a developer and may present a rating questionnaire and/or survey allowing a developer to self-rate one or more portions, or the entirety of, the game 105. A "rating" as used herein may be a measure of the suitability of a particular game to be presented to a particular audience. Examples of game ratings can include ratings of a video game content rating system. A video game content rating system is a system used for the classification of video games into suitability-related groups. Many video game rating systems are associated with and/or sponsored by a government of a particular locale, and are sometimes part of the local motion picture rating system. Accordingly, while particular ratings may be termed differently (e.g., E for Everyone and/or G for General Audience), each rating may be applicable to a demographic or age group. Thus, the self-rating questionnaire may aid in identifying the demographic or age group rather than a particularly termed rating.

As used herein, a "locale" is associated with an individual user or client device 110, and within a same game session users will or should receive a suitable version of game content (e.g., if American and Brazilians and Germans are all in the same session, game content will be presented based on suitability of the American, Brazilian, and German audience or locales; or other such content localization). For example, as used herein, a game session refers to a plurality of users accessing a game 105 and engaging in the game 105 from one or more locales. According to one implementation, users of a same game session, but residing at different locales, will each receive appropriate content based on the user's demographic data and the locale's restrictions. In this manner, each user may automatically receive different, but appropriate, content. According to other implementations, users of a same game session, but residing at different locales, will each receive the lowest, most appropriately rated content for the most restricted locale to which a player in the game session resides. In this alternative example, every player receives the same content, rated to be in accordance with the most restrictive locale. The same may be varied based on user settings, parental controls, global variables for the game session, and/or other attributes. Accordingly, different alternate content associated with different game sessions may also be processed and distributed as described herein.

Figure 2:
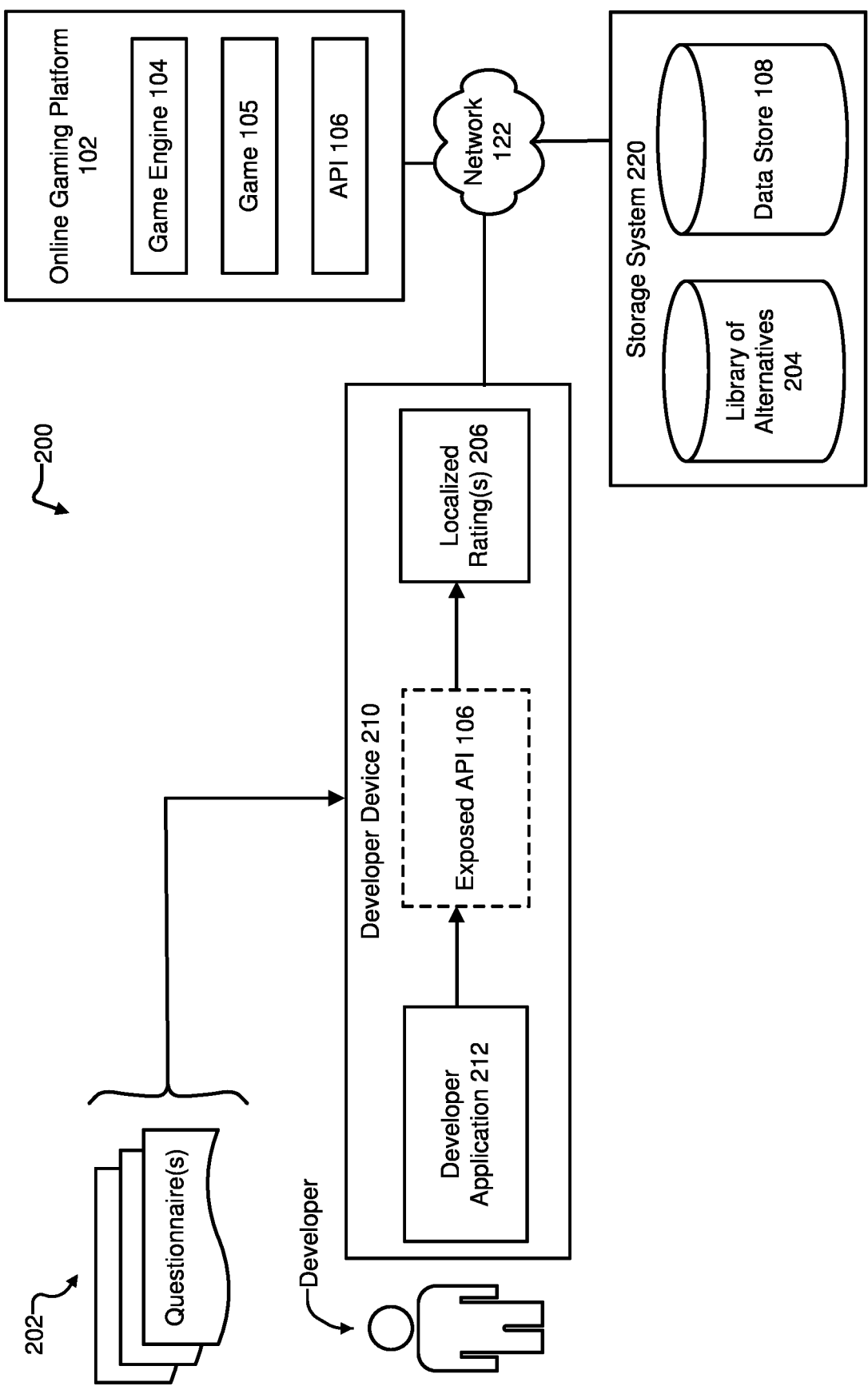
FIG. 2 is a diagram of an example network environment for automatic presentation of suitable content, in accordance with some implementations.

Hereinafter, a more detailed discussion of the API 106 and generation & rating of game content are presented with reference to FIG. 2. FIG. 2 is a diagram of an example developer network environment 200 for automatic presentation of suitable content, in accordance with some implementations. The network environment 200 (also referred to as a "system" herein) includes the online gaming platform 102, a developer device 210 (generally similar to "client devices 110/116"), and a storage system 220.

In some implementations, the storage system 220 may include the data store 108 and a library of alternatives 204. The storage system 220 may include a non-transitory computer readable memory (e.g., random access memory), a cache, a drive (e.g., a hard drive), a flash drive, a database system, or another type of component or device capable of storing data. The storage system 220 may also include multiple storage components (e.g., multiple drives or multiple databases) that may also span multiple computing devices (e.g., multiple server computers) such as individualized storage components for the library of alternatives 204 and/or the data store 108.

In some implementations, the library of alternatives 204 is configured to store game content, such as game 105 or associated content, that is indexed according to a particular demographic, age group, and/or locale. Thus, if a game 105 is to be presented to a client device associated with a first locale having a first type of restriction on content, alternate content stored at the library of alternatives 204 may be identified which is suitable to that first type of restriction. In this example, the alternate content may be presented to ensure that the presented game 105 meets the first type of restriction. Similarly, if a game 105 is to be presented to a client device associated with a second locale n having no restrictions on content, alternate content stored at the library of alternatives 204 may be ignored and/or less restricted content may be presented.

The library of alternatives 204 may include indexed content as described above which is self-rated using one or more questionnaires 202. Generally, the questionnaires 202 may include one or more questions directed to a type, form, and presentation of content of a particular game. The one or more questions may be tailored to receive one or more multiple choice, binary (e.g., yes or no), or other answers from a game developer. The one or more questions may aid in identifying content that is suitable or unsuitable for a particular demographic or age group of a particular locale. Alternatively, or in combination, developers can tag content to indicate its appropriateness for a specific audience so the game can dynamically fetch an appropriate representation. Additionally, machine learning models may be used to automatically classify audiovisual content to ensure it is surfaced only as appropriate.

For example, and without limitation, the one or more questions contained in the questionnaire may include a series of escalating or deescalating questions related to action, language, violence, currency, fear, adult content, items, humor, crude humor, and/or miscellaneous types of content that any game may contain. Based on the self-reported answers provided, content may be flagged as suitable, appropriate, unsuitable, and/or inappropriate for a particular demographic or age group at a particular locale. Additionally, the flagged content may be associated with one or more content alternatives to be stored at the library of alternatives 204. Thus, while an initial iteration of a developed game may include a plurality of different types of content that may be unsuitable to some demographics based on local laws or regulations, the questionnaires 202 may facilitate generation of content at the library of alternatives 204 such that the unsuitable content may be replaced, during runtime or prior to runtime, at the locales restricting that content through use of the library of alternatives, as described in more detail below.

In some implementations, the API 106 may be exposed to the developer device 210 and developer application 212. The exposed API 106 may present one or more function calls to the developer. For example, the one or more function calls can include, but are not limited to, GetUserLocale(userid)—to get the current user's locale; GetContentItem(userlocale, itemid)—to get a 'version' of the item appropriate for the locale obtained for a user; AddItem(itemID, locale)—e.g., same itemid can be used to refer to alternate versions of the same item based on user locale matching the locale parameter; GetQuestionnaire(locale)—to receive a questionnaire that allows rating for a particular locale; and other suitable function calls. Other implementations may not necessitate explicit function calls (e.g., a developer inserts an object into an online game scene, and that object is loaded dynamically for each client based on their locale configuration).

Generally, the questionnaires 202 may be presented to the developer, based on an API function call, such that self-rating of aspects of the game 105 may occur. During the self-rating using the questionnaires 202, the exposed API 106 may present other function calls (e.g., AddItem(itemID, locale)) to produce alternate content that causes a differing answer any one or more questions of the questionnaire 202. For example, if a game contains violence, the exposed API 106 may present the developer a function to provide a content alternative that mitigates, reduces, or eliminates the level of violence depicted in the game in a locale that has stringent rules on violent content. Thereafter, that content alternative may be indexed and stored with the original content, at the library of alternatives 204. The developer may similarly rate and produce alternatives for each question of the questionnaires 202.

Thereafter, the answers to the questionnaires 202 as well as the content alternatives may be associated with localized ratings 206. The localized ratings 206 may be individualized for each content alternative and/or each game 105. Thus, when a game is to be presented for play by a client device associated with a particular locale, the game engine 104 may identify a localized rating 206 appropriate and suitable for a user at a locale, and present the content (or alternative content) associated with the localized rating 206. In this manner, a user at a less restrictive locale may engage with the same game 105 as a user in a more restrictive locale, using alternate content from the library of alternatives 204.

While some portions of a game 105 may be presented with content alternatives, an overall gameplay may not generally be affected. For example, as the developer chooses which content is produced as an alternative, the developer may choose suitable content alternatives that do not detract from gameplay. This choice may benefit both the developer and the user as the developer increases exposure to more restricted locales, while the user is able to access otherwise inaccessible gameplay. Furthermore, a developer is also offered the choice to only develop alternatives to particular portions of the game 105. Therefore, a developer may choose to deploy a game with only violence alternatives, language alternatives, or other alternatives, while still restricting access for other portions of gameplay such as currency or gambling content. Thus, a developer may still target suitable audiences of a more limited demographic while also increasing monetization or exposure of the game 105.

Technical effects and benefits of the questionnaires 202 and library of alternatives 204 are threefold; the questionnaires offer increased exposure to audiences, increased adherence to local guidelines and regulations, and ensured suitability of content presented at client devices associated with a locale, while also limiting risk in worldwide presentation of games, and also while increasing developer engagement with the online gaming platform 102.

Figure 3:
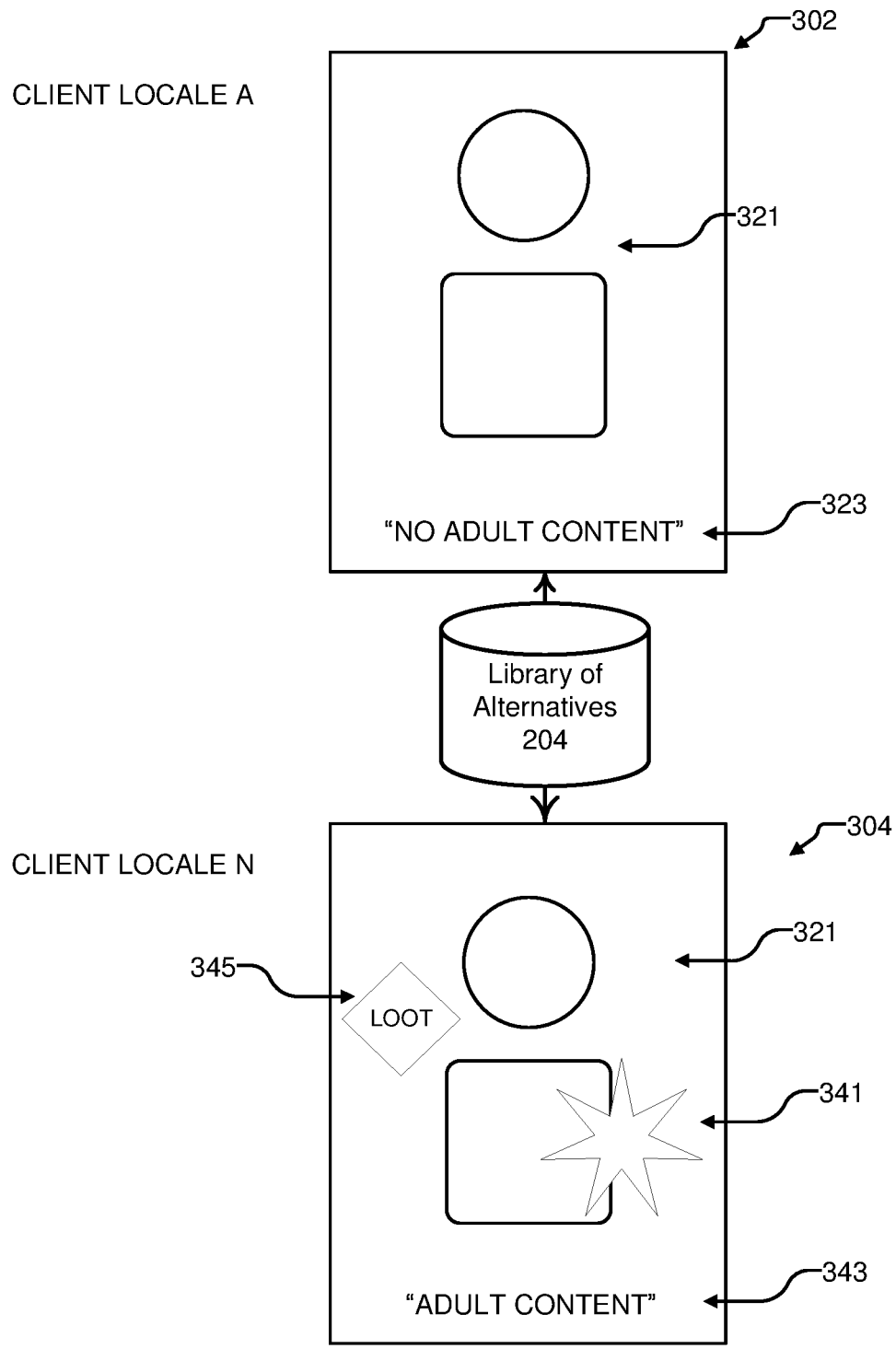
FIG. 3 is a diagram illustrating example presentations of suitable gaming content, in accordance with some implementations.

As described above, developers may produce one or more content alternatives for storage at the library of alternatives 204. FIG. 3 is a diagram illustrating example presentations of suitable gaming content, in accordance with some implementations. As shown in FIG. 3, a first alternate content 302 and a second alternate content 304 may be stored at the library of alternatives 204.

The first alternate content 302 may be content generally suitable for a wide audience across a large number of locales. For example, the first alternate content 302 may include a basic presentation of character 321 devoid of violence, adult content, and/or other restricted content. Furthermore, the first alternate content 302 may include no adult content 323 presented therein. As such, in this example, the first alternate content 302 may be presented to virtually any audience in adherence with guidelines of client locale A.

The second alternate content 304 may be content generally suitable for a restricted audience across a limited number of locales. For example, the second alternate content 304 may include basic presentation of character 321 having a self-rated content containing violence (341) as well as a self-rated content containing currency (245). Furthermore, the second alternate content 304 may include one or more adult content items presented therein (343). As such, in this example, the second alternate content 304 may be presented to an appropriate audience associated with client locale n which meets the guidelines of the client locale n. The appropriate audience may be identified through user data or user demographic data obtained from a user. The user data may include age, demographic, and/or location. User permission is obtained to record and use such data; and if a user doesn't provide such permission data, the generic (e.g., G rated) version of the game and/or game content may be provided as a default. Other user data may also be used to identify any age-related or demographic-related restrictions, including IP address data (e.g., for restricted locations such as schools, edifices, office buildings, etc.), administrator privileges, payment status of account (e.g., for unrestricted premium play features), and other data.

Figure 4:
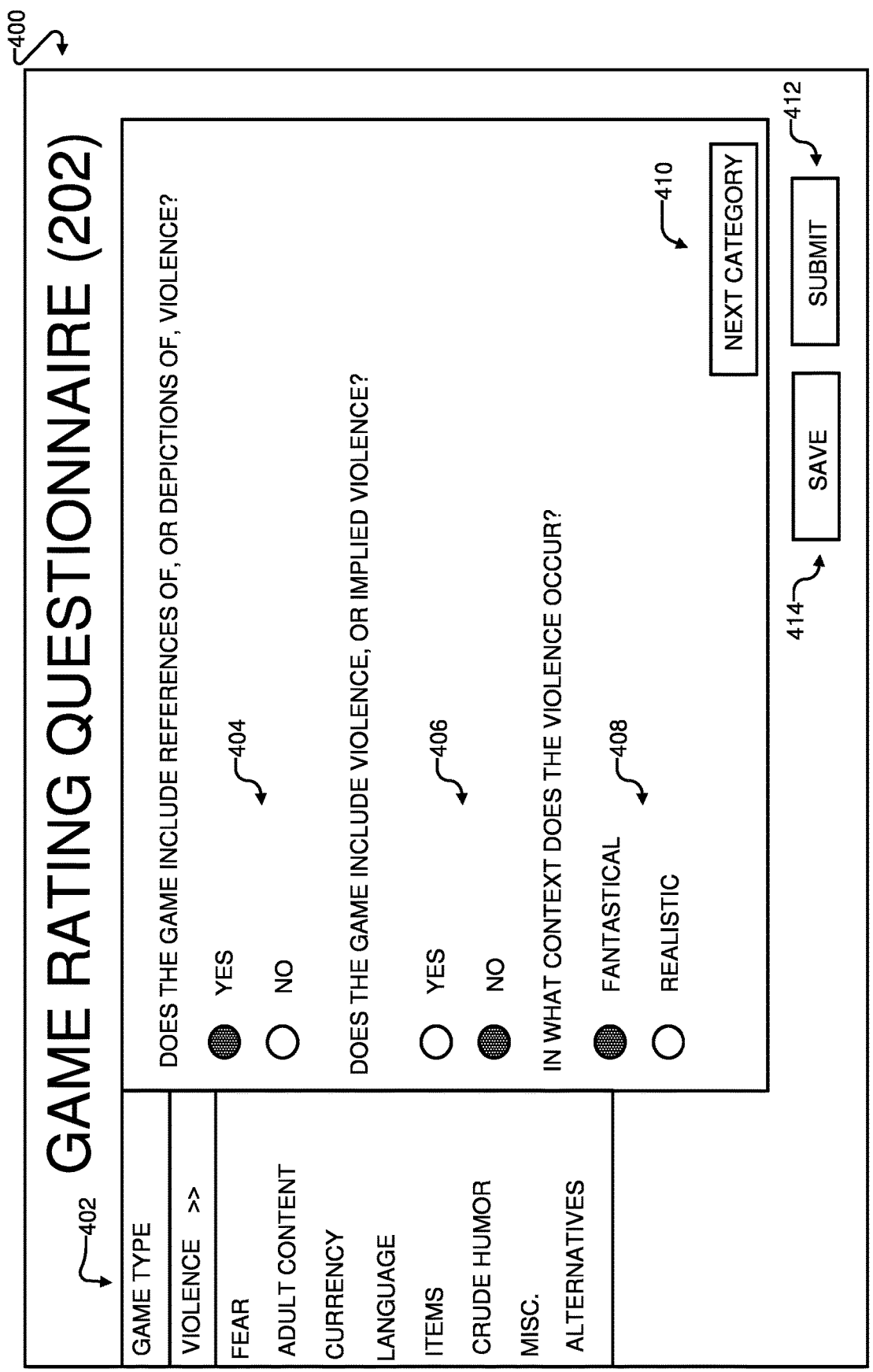
FIG. 4 is a schematic of a developer user interface, in accordance with some implementations.

In some implementations, a developer may develop any number of alternatives to flagged content through the exposed API 106 and/or questionnaires 202. For example, FIG. 4 is a schematic of a developer user interface 400, in accordance with some implementations. The interface 400 includes a content identification portion 402, a plurality of questions 404, 406, 408 associated with one or more content portions, and various control portions 410, 412, 414.

The content identification portion 402 may indicate a particular category of game content and possible alternatives. For example, the content identification portion 402 may provide for selection and answering of questions related to type of game, violence, fear, adult content, currency, language, items, crude humor, miscellaneous content, and/or possible alternatives. As the developer selects a particular category from 402, the developer may answer questions 404, 406, and 408. It is noted that although a limited number of questions is illustrated for the sake of brevity and clarity, any number of questions may be implemented.

Based on a particular answer to a particular question 404, 406, and 408, a localized rating 206 for a particular locale may be generated. Furthermore, alternatives (e.g., 402) may be designated such that localized ratings 206 can be generated for each content alternative. In this manner, while a typical game has a single content rating for a single locale, games 105 according to some implementations may include a plurality of ratings based on a plurality of content alternatives. As such, any combination of self-rated alternative content may be used to form a game 105 presented to client devices associated with a particular locale. Thus, while a game played in locale A may be restricted to include content similar to example content 302, a game played in locale n may include content similar to example content 304, in some implementations. Various other combinations, including combinations where not all audiences can be presented suitable content are possible. However, in general, a greater number of users may be presented content if even a limited number of content alternatives (or even a single content alternative to violence, for example) are created with the exposed API 106 and questionnaires 202.

As presented above, content alternatives stored at the library of alternatives 204, may allow presentation of suitable content to wider audiences in multiple locales having content regulations that restrict content. These alternatives may allow a developer's game to reach a greater number of users and therefore increase engagement in the online gaming platform 102.

Figure 5:
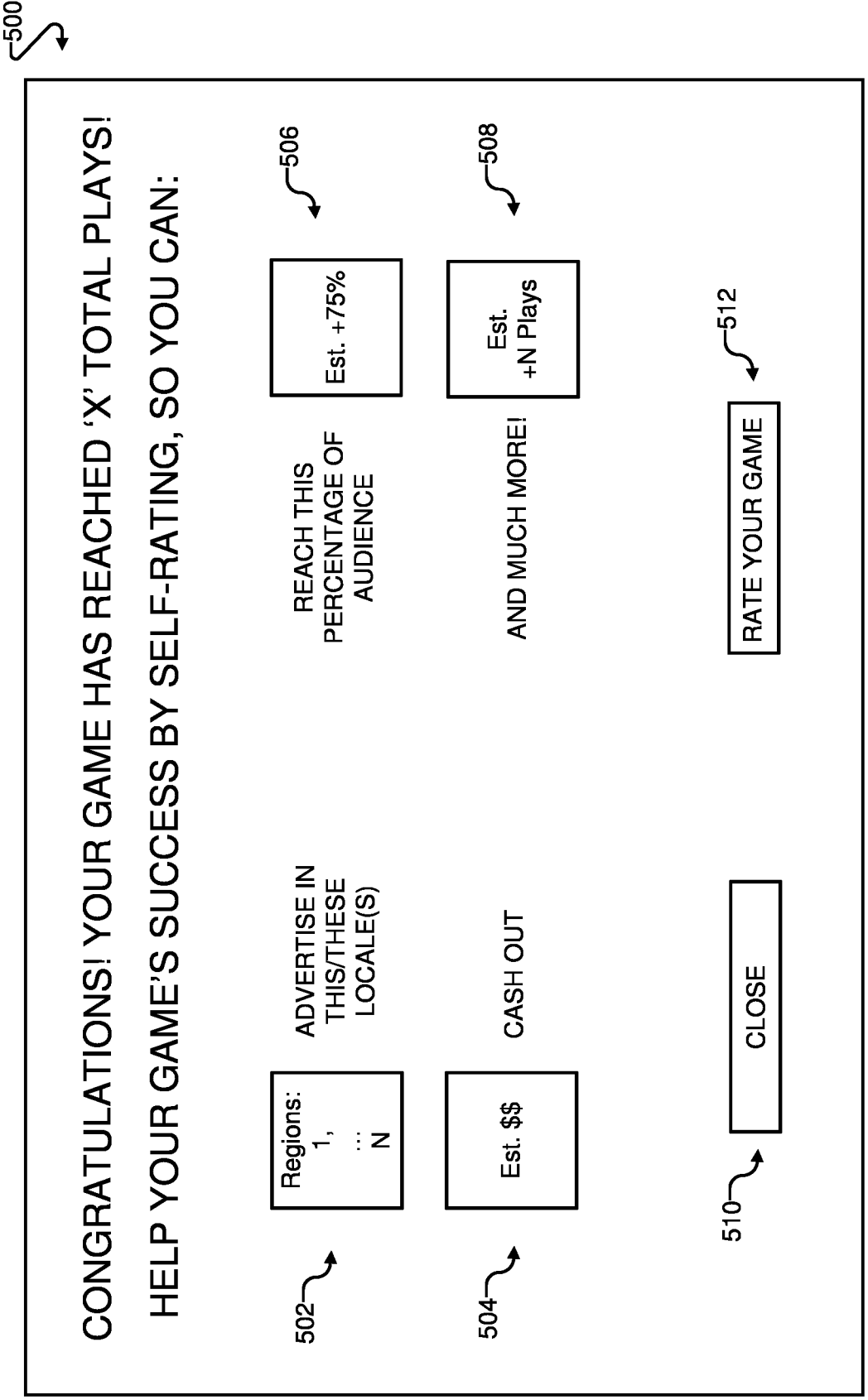
FIG. 5 is a schematic of a developer user interface, in accordance with some implementations.

FIG. 5 is a schematic of a developer user interface 500, in accordance with some implementations. As illustrated, the user interface 500 provides a developer with a visualization of an increase in engagement, monetization, advertisement, and other metrics based on use of the exposed API 106 and self-rating methodologies. For example, a developer may be presented the user interface 500 upon creation of a game 105. The user interface 500 may present the developer various metrics or statistics of possible benefits to self-rating and/or creation of content alternatives. The illustrated increases in engagement described below may be generated based on historical analysis of engagement in multiple locales, empirical analysis of engagement based on larger audiences and/or alternative content, and other estimations.

Portion 502, for example, may present the developer with the option of advertising in other locales based on self-rating; portion 504 may present the developer with monetization metrics based on self-rating; portion 506 may present the developer with engagement metrics based on self-rating; and, portion 508 may present the developer with other metrics (e.g., an increase in number of plays or sessions) based on self-rating. If choosing to self-rate, the developer may select interface control portion 512 which may direct the developer to one or more of the questionnaires 202 and/or API 106 as described above. Additionally, a developer may select interface control portion 510 to exit the interface 500.

As described above, a developer may be presented with one or more questionnaires 202 and exposed API 106 for generation of self-ratings and content alternatives. Using the content alternatives and associated localized ratings, a game 105 may be presented to different audiences across different locales, thereby increasing engagement with the online gaming platform 102 while also ensuring local guidelines and regulations related to content restrictions are observed. In this manner, a developer can concentrate on content creation, rather than content restriction, and can be provided with automated tools for presentation of suitable content outside of the developer's knowledge of regional restrictions.

Hereinafter, methods of operations of the network environments 100 and 200, including the online gaming platform 102 and associated components, are described in detail with reference to FIG. 6 and FIG. 7.

Figure 6:
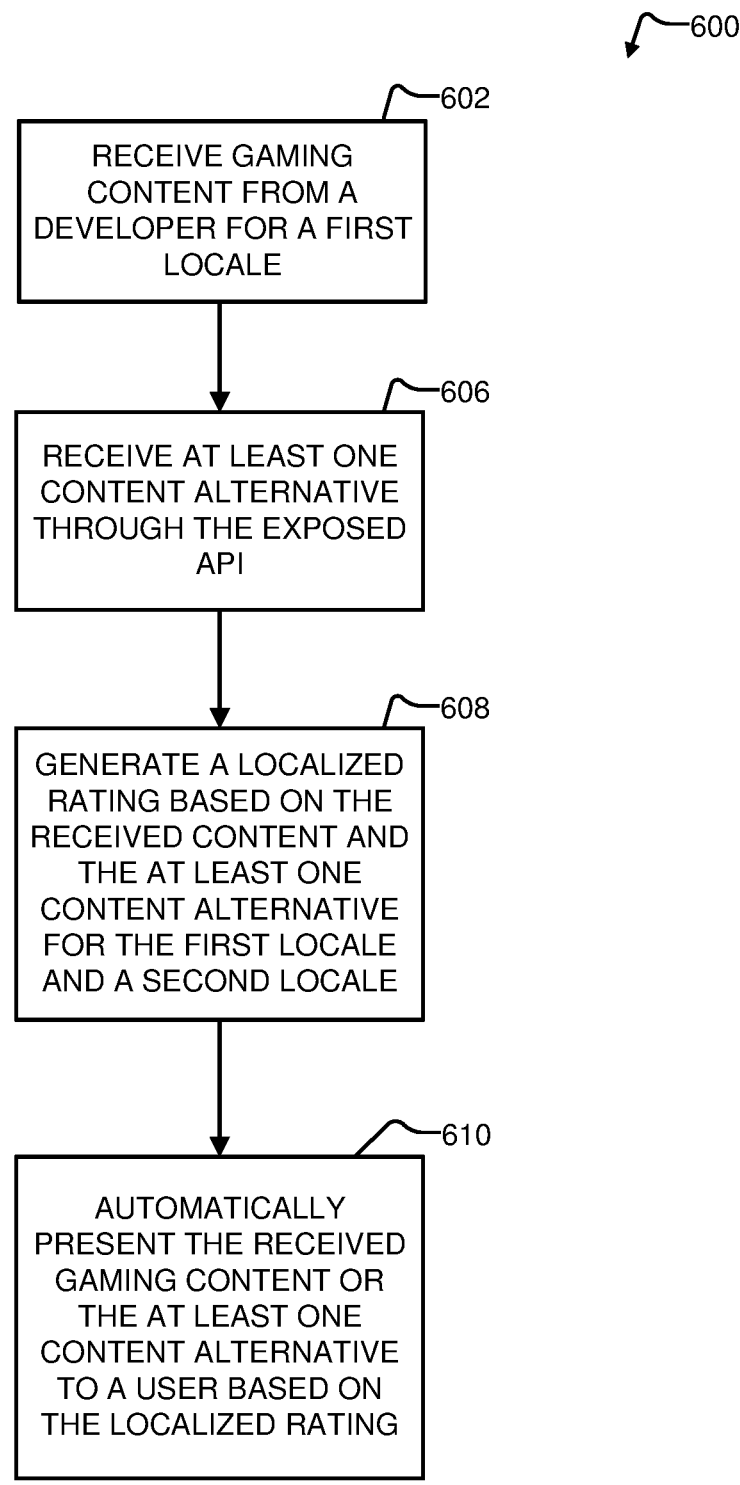
FIG. 6 is a flowchart illustrating an example method of automatic presentation of suitable content, in accordance with some implementations.

FIG. 6 is a flowchart illustrating an example method 600 of automatic presentation of suitable content, in accordance with some implementations. The method 600 begins at block 602. At block 602, gaming content is received from a developer. The gaming content and/or the developer may be associated with a first locale. A "locale" is associated with an individual user, developer, developer device 210, and/or client device 110. Accordingly, the first locale may be similar to locale A or n, and may have a governing body responsible for local governance and content restrictions for video games, media content, game content, movies, and/or other content.

In some implementations, the gaming content may be associated with game 105. For example, the game 105 may include one or more game sessions, as well. For example, the game engine 107 and/or game server 104 may allow for many sessions of the same game 105 with each session having its own environment (e.g., 5 players could together play a session of a pizza shop game, and a separate 3 players could play another session of the same game). The developer-provided content in both game sessions would be same, but the virtual avatars, user-generated content, and other content of the players would be specific, and the environment could develop differently, (e.g., the shops and pizza menus would be different) based on the actions by the respective players.

The API 106 is exposed to the developer, through the developer device 210. For example, the developer application 212 may display or grant access to various instruction(s) and function calls of the exposed API 106. Using the exposed API 106, the developer may develop gaming content alternatives for storage in the library of alternatives 204. The gaming content alternatives may include alternative content, such as limited violence, obscured virtual money, tamer language, language translations, and other alternative content. Furthermore, using the exposed API 106, the developer may develop monetization features, advertising features, and/or other features. Block 602 may be followed by block 606.

At block 606, at least one content alternative is received through the exposed API 106 and stored at the library of alternatives 204 (or alternatively, at the storage system 220/data store 108). The stored at least one content alternative may be indexed such that it is easily presented in place of the received gaming content, in some implementations. The index may include a placeholder, timestamp, or other identification data such that it is readily identifiable as an alternative to the received gaming content. For example, each portion of alternate content may include at least an identifier, such as an itemID, gameID, locale, developerID, and/or other identifiers. The alternate content may subsequently be retrieved based on a current state of gameplay being matched to the stored identifiers. In this manner, a database call may be made to retrieve alternate or original content, based on a rating or locale, and an appropriate identifier. Block 606 may be followed by block 608.

At block 608, a localized rating for the received gaming content and/or the at least one content alternative is generated. As described above, the localized rating may be based on one or more questionnaires, local guidelines, local governance, or other parameters. The localized rating may be based on a developer's self-rating of particular portions of a game, and may be inclusive of those portions of the game. Furthermore, rating review and generation may be automated by scanning game assets automatically and comparing them against the developer-supplied rating. Additionally, ratings may be computed automatically based on this information which would reduce the amount of information solicited from the developer. Generally, as multiple individual localized ratings may exist for a particular game based on multiple alternate contents, there are many permutations of a particular game available.

The localized rating may be associated with a particular locale or multiple locales with similar video game ratings systems in place. As such, a localized rating for the received gaming content may include one rating for a first locale, one rating for a second locale, and so forth. Similarly, the at least one content alternative may include one rating for the first locale, one rating for the second locale, and so forth. Block 608 may be followed by block 610.

At block 610, the received gaming content or the at least one content alternative is provided to a user automatically, based on the localized rating. For example, if being presented at Locale A, gaming content 302 may be presented (FIG. 3). Additionally, if being presented at Locale n, gaming content 304 may be presented (FIG. 3). To manage different locales, a hierarchical tree may be created which starts with the global default at the root and allows customization of specific elements at each node in the subtree. This would allow the flexibility to tailor only specific features for a given locale/country but follow all other defaults and also to nest regions within each other.

It should be readily understood that multiple other content alternatives may each have associated localized ratings, and therefore, this example is non-limiting of all implementations. Furthermore, localized ratings may exceed suitability for some demographics (e.g., if the locale is very restrictive), and therefore, there may be no suitable content available for presentation. In these scenarios, a developer may develop additional content alternatives such that one or more suitable alternatives may be presented. Furthermore, given that regulations at particular locales may change, alternatives may be rated multiple times to ensure continued adherence to local guidelines and restrictions.

Blocks 602-610 can be performed (or repeated) in a different order than described above and/or one or more steps can be omitted. For example, block 606 and 608 may be performed multiple times, e.g., to receive multiple alternatives to content and multiple ratings. In this manner, portions of method 600 may be repeated until all portions of a gaming session are appropriately rated for a client locale, using data stored in the platform.

Figure 7:
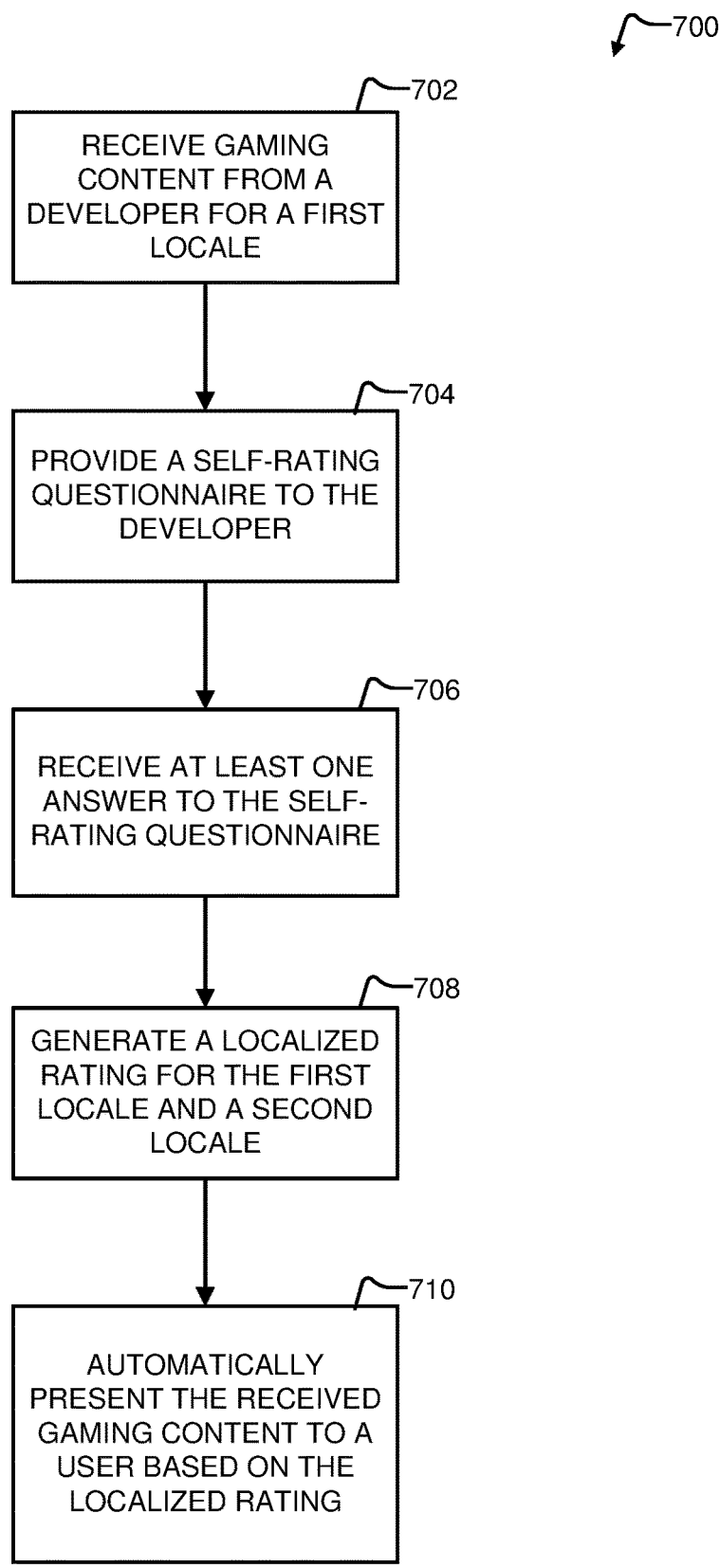
FIG. 7 is a flowchart illustrating another example method of automatic presentation of suitable content, in accordance with some implementations.

FIG. 7 is a flowchart illustrating another example method 700 of automatic presentation of suitable content, in accordance with some implementations. The method 700 begins at block 702. At block 702, gaming content is received from a developer. The gaming content and/or the developer may be associated with a first locale. A "locale" is associated with an individual user, developer, developer device 210, and/or client device 110. Accordingly, the first locale may be similar to locale A or n, and may have a governing body responsible for local governance and content restrictions for video games, media content, game content, movies, and/or other content.

In some implementations, the gaming content may be associated with game 105. For example, the game 105 may include one or more game sessions, as well. For example, the game engine 107 and/or game server 104 may allow for many sessions of the same game 105 with each session having its own environment (e.g., 5 players could together play a session of a pizza shop game, and a separate 3 players could play another session of the same game). The developer-provided content in both game sessions would be same, but the virtual avatars, user-generated content, and other content of the players would be specific, and the environment could develop differently, (e.g., the shops and pizza menus would be different) based on the actions by the respective players. Block 702 is followed by block 704.

At block 704, a self-rating questionnaire or questionnaires 202 are provided to the developer, through the developer device 210. For example, the developer application 212 may display or grant access to the questionnaires 202. Using the questionnaires 202, the developer may flag particular content as containing possibly restricted content, develop gaming content alternatives for storage in the library of alternatives 204, and otherwise self-rate portions of the received gaming content. The gaming content alternatives may include alternative content, such as limited violence, obscured virtual money, tamer language, language translations, and other alternative content. The self-ratings may be in the form of answers to the questionnaires 202. Block 704 is followed by block 706.

At block 706, at least one answer to the displayed questionnaires 202 is received. The at least one answer may identify one or more portions of the received gaming content as containing violence, fear, adult content, currency, language, items, crude humor, or other content. The at least one answer may also relate to a level of violence, fear, adult content, currency, language, items, crude humor, or other content. For example, the at least one answer may reference a number of occurrences, a number of depictions, a type of depiction (real or fantasy), whether the content is "implied" rather than directly shown, and other similar references. Block 706 is followed by block 708.

At block 708, a localized rating for the received gaming content is generated for a first locale and a second locale, based on the at least one answer. As described above, the localized rating may be based on one or more questionnaires, local guidelines, local governance, or other parameters. The localized rating may be associated with a particular locale or multiple locales with similar video game ratings systems in place. As such, a localized rating for the received gaming content may include one rating for a first locale, one rating for a second locale, and so forth. Block 708 is followed by block 710.

At block 710, the received gaming content is provided to a user automatically, based on the localized rating. For example, if being presented at Locale A, gaming content 302 may be presented if the localized rating permits display of content 302. Additionally, if being presented at Locale n, gaming content 302 may be presented if the localized rating permits display of content 302.

It should be readily understood that localized ratings may exceed suitability for some demographics (e.g., if the locale is very restrictive), and therefore, there may be no suitable content available for presentation. In these scenarios, a developer may develop additional content alternatives such that one or more suitable alternatives may be presented, such as described with reference to FIG. 3 and FIG. 6. Furthermore, given that regulations at particular locales may change, the received content may be rated multiple times to ensure continued adherence to local guidelines and restrictions.

Blocks 702-710 can be performed (or repeated) in a different order than described above and/or one or more steps can be omitted. For example, blocks 704, 706, and 708 may be performed multiple times, e.g., to rate for multiple locales. In this manner, portions of method 700 may be repeated until all portions of a gaming session are appropriately rated for a client locale, using data stored in the platform.

Figure 8:
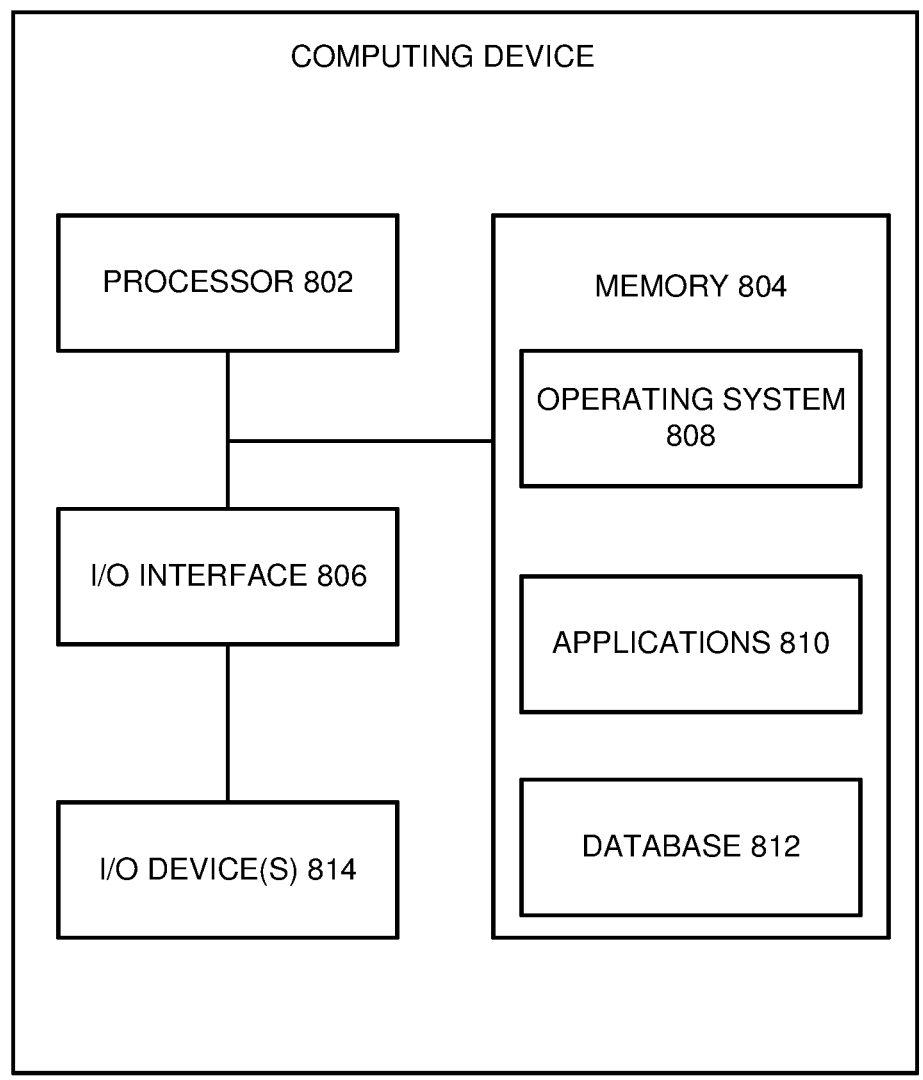
FIG. 8 is a block diagram illustrating an example computing device, in accordance with some implementations.

FIG. 8 is a block diagram of an example computing device 800 which may be used to implement one or more features described herein. In one example, device 800 may be used to implement a computer/client device (e.g. 110 of FIG. 1, 210 of FIG. 2), and perform appropriate method implementations (e.g. 600 of FIG. 6 and 700 of FIG. 7) described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814.

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808, one or more applications 810, e.g., a translation application and database 812. In some implementations, application 810 can include instructions that enable processor 802 to perform the functions (or control the functions of) described herein, e.g., some or all of the methods described with respect to FIG. 6 and FIG. 7.

For example, applications 810 can include a rating application (e.g., to present a questionnaire) and/or database module 812, which as described herein can provide localized ratings of gaming content for an online gaming content server (e.g., 104). Any of software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 120, 122), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 814 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 8 shows one block for each of processor 802, memory 804, I/O interface 806, and software blocks 808 and 810. These blocks may represent one or more processors or processing circuitries, operating systems, memories, I/O interfaces, applications, and/or software engines. In other implementations, device 800 may not have all of the components shown and/or may have other elements including other types of elements instead of, or in addition to, those shown herein. While the online gaming server 104 is described as performing operations as described in some implementations herein, any suitable component or combination of components of online gaming server 104 or similar system, or any suitable processor or processors associated with such a system, may perform the operations described.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 600 and/or 700) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method of automatic presentation of suitable content, the method comprising:
   receiving gaming content associated with a game associated with a first client locale and a developer, the received gaming content including content that is restricted at a second client locale;
   receiving at least one content alternative, the at least one content alternative being an alternative to replace the received gaming content;
   generating a first localized rating for the received gaming content and a second localized rating for the at least one content alternative, wherein an application programming interface (API) is exposed to the content developer, the API usable in computer code to automatically generate the first localized rating and the second localized rating; and
   automatically providing the received gaming content or the at least one content alternative to a user device associated with the second client locale based on the first localized rating and the second localized rating.

2. The computer-implemented method of claim 1, wherein the developer is associated with the first client locale.

3. The computer-implemented method of claim 2, wherein the API is further usable in computer code to automatically generate the at least one content alternative.

4. The computer-implemented method of claim 1, wherein generating the first localized rating and the second localized rating comprises receiving from the developer a self-rating of the received gaming content and a self-rating of the at least one content alternative.

5. The computer-implemented method of claim 4, wherein receiving the self-rating of the received gaming content and the self-rating of the at least one content alternative comprises receiving, from the developer, a flag for content that is unsuitable for a particular demographic of users.

6. The computer-implemented method of claim 1, wherein the first localized rating is a video game rating associated with a set of local rules associated with the first client locale, and wherein the second localized rating is a video game rating associated with a set of local rules associated with the second client locale.

7. The computer-implemented method of claim 1, wherein the at least one content alternative is indexed and stored in a library of alternatives and is identifiable as a replacement for the received gaming content.

8. The computer-implemented method of claim 1, wherein the automatically providing comprises:
   determining that the first localized rating is suitable for the second client locale; and
   responsive to determining that the first localized rating is suitable for the second client locale, presenting the received gaming content to the user device associated with the second client locale.

9. The computer-implemented method of claim 1, wherein the automatically providing comprises:
   determining that the first localized rating is unsuitable for the second client locale;
   determining that the second localized rating is suitable for the second client locale; and
   responsive to determining that the second localized rating is suitable for the second client locale, presenting the at least one content alternative to the user device associated with the second client locale.

10. A system comprising:
    a memory with instructions stored thereon; and
    a processing device, coupled to the memory, the processing device configured to access the memory and execute the instructions, wherein the instructions cause the processing device to perform operations including:
    receiving gaming content associated with a game associated with a first client locale and a developer, the received gaming content including content that is restricted at a second client locale;
    receiving at least one content alternative, the at least one content alternative being an alternative to replace the received gaming content;
    generating a first localized rating for the received gaming content and a second localized rating for the at least one content alternative, wherein an application programming interface (API) is exposed to the content developer, the API usable in computer code to automatically generate the first localized rating and the second localized rating; and automatically providing the received gaming content or the at least one content alternative to a user device associated with the second client locale based on the first localized rating and the second localized rating.

11. The system of claim 10, wherein the developer is associated with the first client locale, and wherein the API is further usable by the developer in computer code to automatically generate the at least one content alternative.

12. The system of claim 11, wherein generating the first localized rating and the second localized rating comprises receiving from the developer a self-rating of the received gaming content and a self-rating of the at least one content alternative.

13. The system of claim 12, wherein receiving the self-rating of the received gaming content and the self-rating of the at least one content alternative comprises receiving, from the developer, a flag for content that is unsuitable for a particular demographic of users.

14. The system of claim 10, wherein the first localized rating is a video game rating associated with a set of local rules associated with the first client locale, and wherein the second localized rating is a video game rating associated with a set of local rules associated with the second client locale.

15. The system of claim 10, further comprising a library of alternatives, and wherein the at least one content alternative is indexed and stored in the library of alternatives and is identifiable as a replacement for the received gaming content.

16. The system of claim 10, wherein the automatically providing comprises:
   determining that the first localized rating is suitable for the second client locale; and
   responsive to determining that the first localized rating is suitable for the second client locale, presenting the received gaming content to the user device associated with the second client locale.

17. The system of claim 10, wherein the automatically providing comprises:
   determining that the first localized rating is unsuitable for the second client locale;
   determining that the second localized rating is suitable for the second client locale; and
   responsive to determining that the second localized rating is suitable for the second client locale, presenting the at least one content alternative to the user device associated with the second client locale.

18. A non-transitory computer-readable medium with instructions stored thereon that, responsive to execution by a processing device, causes the processing device to perform operations comprising:
   receiving gaming content associated with a game associated with a first client locale and a developer, the received gaming content including content that is restricted at a second client locale;
   receiving at least one content alternative, the at least one content alternative being an alternative to replace the received gaming content;
   generating a first localized rating for the received gaming content and a second localized rating for the at least one content alternative, wherein an application programming interface (API) is exposed to the content developer, the API usable in computer code to automatically generate the first localized rating and the second localized rating; and
   automatically providing the received gaming content or the at least one content alternative to a user device associated with the second client locale based on the first localized rating and the second localized rating.

* * * * *